United States Patent
Yang et al.

(10) Patent No.: US 11,535,265 B2
(45) Date of Patent: Dec. 27, 2022

(54) POINT CLOUD DATA PROCESSING METHOD, APPARATUS, DEVICE, VEHICLE AND STORAGE MEDIUM

(71) Applicant: APOLLO INTELLIGENT DRIVING TECHNOLOGY (BEIJING) CO., LTD., Beijing (CN)

(72) Inventors: Fan Yang, Beijing (CN); Yunlong Li, Beijing (CN); Chen Chen, Beijing (CN); Rongxun Jing, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 83 days.

(21) Appl. No.: 16/708,560

(22) Filed: Dec. 10, 2019

(65) Prior Publication Data

US 2020/0180652 A1    Jun. 11, 2020

(30) Foreign Application Priority Data

Dec. 10, 2018    (CN) .......................... 201811502444.X

(51) Int. Cl.
*B60W 50/02*    (2012.01)
*G06K 9/62*    (2022.01)
(Continued)

(52) U.S. Cl.
CPC ........ *B60W 50/0205* (2013.01); *B60W 30/18* (2013.01); *B60W 50/038* (2013.01);
(Continued)

(58) Field of Classification Search
CPC ............ B60W 50/0205; B60W 30/18; B60W 50/038; B60W 2556/00; B60W 2050/0215; B60W 2720/106; G06K 9/6289
See application file for complete search history.

(56) References Cited

U.S. PATENT DOCUMENTS

2003/0034778 A1*   2/2003   Nelson ................... G01V 3/105
                                                           324/329
2014/0285634 A1    9/2014   Rhoads
(Continued)

FOREIGN PATENT DOCUMENTS

CN    104050640 A    9/2014
CN    105953747 A    9/2016
(Continued)

OTHER PUBLICATIONS

First Office Action Issued in Chinese Patent Application No. 201811502444.X, dated Jun. 30, 2020, 7 pages.

*Primary Examiner* — Jeff A Burke
*Assistant Examiner* — Jamal A Shah
(74) *Attorney, Agent, or Firm* — Dilworth IP, LLC

(57) ABSTRACT

The present application provides a point cloud data processing method, an apparatus, a device, a vehicle, and a storage medium, the method includes: acquiring, according to a preset frequency, raw data collected by sensors on a vehicle; and performing, according to the raw data of the sensors, data fusion processing to obtain a fusion result. By acquiring, according to the preset frequency, the raw data collected by the sensors on the vehicle in a latest period, and performing the data fusion processing to obtain the fusion result, a synchronous clock source may be removed, a weak clock synchronization may be realized, and the cost may be effectively reduced. The preset frequency may be flexibly set, which, when set with a larger value, can reduce a time difference between the raw data of the sensors and improve data accuracy.

12 Claims, 3 Drawing Sheets

(51) Int. Cl.
*B60W 30/18* (2012.01)
*B60W 50/038* (2012.01)

(52) U.S. Cl.
CPC ... G06K 9/6289 (2013.01); *B60W 2050/0215* (2013.01); *B60W 2556/00* (2020.02); *B60W 2720/106* (2013.01)

(56) References Cited

U.S. PATENT DOCUMENTS

2017/0371348 A1* 12/2017 Mou ............... G01S 17/42
2019/0232950 A1* 8/2019 Atluri ............ B60W 30/18145
2020/0025873 A1* 1/2020 Kubertschak ............ G01S 7/40

FOREIGN PATENT DOCUMENTS

CN 106407947 A 2/2017
CN 108154560 A 6/2018

* cited by examiner

US 11,535,265 B2

POINT CLOUD DATA PROCESSING METHOD, APPARATUS, DEVICE, VEHICLE AND STORAGE MEDIUM

CROSS-REFERENCE TO RELATED APPLICATION

This application claims priority to Chinese Patent Application No. 201811502444.X, filed on Dec. 10, 2018, which is hereby incorporated by reference in its entirety.

TECHNICAL FIELD

The present application relates to the field of automatic driving technology, and in particular, to a point cloud data processing method, an apparatus, a device, a vehicle, and a storage medium.

BACKGROUND

In the process of automatic driving of a vehicle, sensors such as a laser radar and a camera are usually used to collect environmental information around the vehicle and form three-dimensional point cloud data.

Since physical points that can be scanned by each laser radar are limited when collecting the environmental information, a single laser radar cannot acquire complete information around the vehicle, and it is required to set multiple laser radars on the vehicle to rotationally scan in different directions. When there are multiple laser radars, the physical points scanned by rotations of different laser radars are different, and the physical points scanned by the multiple laser radars may not be synchronized. In the prior art, it usually sets a synchronous clock to ensure that the sensors obtain a clock trigger signal at a same time point and begin data collection. After the sensors scan one turn, raw data of the sensors is acquired, and data fusion is performed on the raw data of the sensors to form complete surrounding environment information.

However, the method of being triggered by the synchronous clock in the prior art may easily cause a large time difference between the raw data collected by the sensors, which may be 100 milliseconds, thereby causing finally obtained point cloud data to be inaccurate and affecting sensing of surrounding area of the vehicle.

SUMMARY

The present application provides a point cloud data processing method, an apparatus, a device, a vehicle, and a storage medium, so as to solve the defects in the prior art such as low accuracy of point cloud data.

A first aspect of the present application provides a point cloud data processing method, including:

acquiring, according to a preset frequency, raw data collected by sensors on a vehicle; and performing, according to the raw data of the sensors, data fusion processing to obtain a fusion result.

A second aspect of the present application provides a point cloud data processing apparatus, including:

an acquiring module, configured to acquire, according to a preset frequency, raw data collected by sensors on a vehicle; and a processing module, configured to perform, according to the raw data of the sensors, data fusion processing to obtain a fusion result.

A third aspect of the present application provides a computer device including at least one processor and a memory;

the memory stores a computer program; the at least one processor executes the computer program stored in the memory to implement the method of the first aspect.

A fourth aspect of the present application provides a vehicle including at least two sensors and an apparatus as provided in the second aspect.

A fifth aspect of the present application provides a computer readable storage medium storing a computer program that, when executed, implements the method of the first aspect.

The point cloud data processing method, the apparatus, the device, the vehicle and the storage medium according to the present application, by acquiring, according to the preset frequency, the raw data collected by the sensors on the vehicle in a latest period, and performing the data fusion processing to obtain the fusion result, may remove a synchronous clock source, realize a weak clock synchronization, and effectively reduce the cost. The preset frequency may be flexibly set, which, when set with a larger value, can reduce a time difference between the raw data of the sensors and improve data accuracy.

BRIEF DESCRIPTION OF THE DRAWINGS

In order to more clearly illustrate the technical solutions in embodiments of the present application or in the prior art, a brief introduction to the drawings used for describing the embodiments or the prior art will be made below. Obviously, the drawings in the following description show some embodiments of the present application, and those skilled in the art may still derive other drawings from these drawings without any creative effort.

Figure 1:
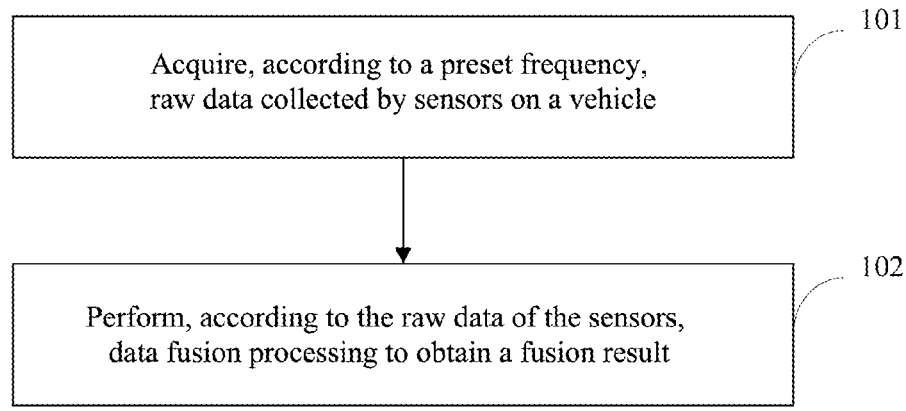
FIG. 1 is a schematic flowchart of a point cloud data processing method according to an embodiment of the present application.

A clear embodiment of the present application has been shown through the previous drawings and will be described in detail below. These drawings and the written description are not intended to limit the scope of the present disclosure in any way, but rather to illustrate the concept of the present application for those skilled in the art by referring to specific embodiments.

DESCRIPTION OF EMBODIMENTS

To make the purposes, technical solutions and advantages of embodiments of the present application clearer, the technical solutions in the embodiments of the present application will be clearly and completely described below with reference to the drawings in the embodiments of the present application. Apparently, the described embodiments are some but not all of the embodiments of the present application. All other embodiments obtained by a person of ordinary skill in the art based on the embodiments of the present application without any creative effort fall within the protection scope of the present application.

First, terms involved in the present application are explained:

point cloud data: in the prior art, laser scanning is used widely to acquire point cloud data of environment; when a laser beam irradiates a surface of an object, reflected laser carries information such as orientation and distance. When the laser beam is scanned according to a certain trajectory, reflected laser spot information will be recorded while scanning; since the scanning is extremely fine, a large number of laser spots can be obtained, and thus laser point cloud data of the object can be formed. The point cloud data is a collection of massive point clouds of characteristics on a target surface.

A point cloud data processing method according to the embodiment of the present application is applicable to a scenario in which a vehicle acquires surrounding environment information through multiple sensors on the vehicle during an automatic driving process, and senses surrounding environment, so as to realize automatic driving.

In addition, terms "first", "second" and the like are merely used for illustrative purpose and are not to be construed as indicating or implying a relative importance or implicitly indicating a number of technical features indicated. In the description of each of the following embodiments, "multiple" means more than two unless specifically defined otherwise.

The following specific embodiments may be combined with each other, and the same or similar concepts or processes may not be repeated in some embodiments. The embodiments of the present disclosure will be described below with reference to the drawings.

Embodiment I

The present embodiment provides a point cloud data processing method that is used for processing data collected by sensors during automatic driving of a vehicle. An execution body of the present embodiment is a point cloud data processing apparatus, and the apparatus may be disposed on a vehicle or other devices that need to sense surrounding environment information, or may be disposed on a computer device, and the computer device may be disposed on a vehicle or other devices that need to sense the surrounding environment.

FIG. 1 is a schematic flowchart of a point cloud data processing method according to the present embodiment, the method includes:

Step 101, acquire, according to a preset frequency, raw data collected by sensors on a vehicle.

Specifically, the vehicle may be an automatic driving vehicle, a semi-automatic driving vehicle, and the like. The vehicle is provided with multiple laser radars, and of course, other sensors such as cameras (such as binocular cameras, monocular cameras) may also be provided, and the vehicle needs to sense the surrounding environment by these sensors during actual driving. The point cloud data processing apparatus can acquire the raw data collected by the sensors on the vehicle according to the preset frequency, for example, reading every 0.5 milliseconds, and the laser radars may keep rotating and scanning without stopping, or without waiting for a clock. The raw data collected in a latest period of scanning is read every time.

For the laser radars, the raw data is essentially point cloud data.

In order to sense different directions around the vehicle, multiple laser radars can be placed to cover all directions around the vehicle.

Optionally, scanning directions of the laser radars may have overlapping portion to ensure data integrity.

Optionally, raw data collected by camera sensors may also be acquired, where the raw data is image data, and may be fused with the point cloud data of the laser radars during subsequent data fusion, so as to add image related information (such as color) to the point cloud data of the laser radars. The specific processing of the image data will not be repeated in the present embodiment.

Step 102, perform, according to the raw data of the sensors, data fusion processing to obtain a fusion result.

Specifically, after acquiring the raw data collected by the sensors, the data fusion processing may be performed according to the raw data of the sensors, so as to obtain the fusion result.

Optionally, the raw data collected by the sensors may be converted to a same coordinate, overlapping portions are processed to realize de-overlapping, and then combination is performed to acquire a batch of point cloud data in the same coordinate. The specific data fusion processing manner may be any implementable form in the prior art, which is not limited in the present embodiment.

Optionally, an amount of the raw data for data fusion may be set according to actual needs. For example, it may be fused once for each acquisition, and a fusion result may not be complete environmental information, and the complete environmental information may be formed after multiple acquisitions and fusions. Alternatively, a preset number of times may be set, namely, when a number of acquisition times of the raw data reaches the preset number of times, the raw data acquired in these times is fused together, and the specific preset number of times can be set as required and is not limited in the present embodiment.

Optionally, each point in the raw data has a corresponding timestamp, and a corresponding relationship between the raw data collected by different sensors at different times may be implemented according to the timestamp and the point coordinate.

Optionally, the preset number of times may be set as required according to a time required for the sensors to scan one turn and the preset frequency. For example, the sensors need 100 milliseconds to scan one turn, a period corresponding to the preset frequency is 0.5 milliseconds, the preset number of times can range from 1 to 200, and the preset number of times being set as 200 is equivalent to that the sensors scan one turn, and the complete environmental information may be acquired through one data fusion.

Optionally, some of the data (that is, the overlapping portion may be excluded, or a few overlapping portions may be included, and it is set specifically as required) may be acquired according to scanning angles of the sensors, so as to be used for data fusion, thereby improving a fusion efficiency. For example, a first sensor scans for 0-120 degrees, and a second sensor scans for 90-180 degrees, such that data within a range of 0-90 degrees in raw data of the first sensor and data within a range of 90-180 degrees in raw data of the second sensor can be acquired for fusion, and this is merely illustrative and is not intended to be limiting. Specifically, settings may be done as required, and is not limited in the present embodiment.

Optionally, the point cloud data processing method for provided by the present embodiment is not limited to be applied to the vehicle, and may be applied to any other scenarios that require real-time sensing of the surrounding environment through a sensor, which is not limited in the present embodiment.

The point cloud data processing method provided by the present embodiment, by acquiring, according to the preset frequency, the raw data collected by the sensors on the vehicle in a latest period, and performing the data fusion processing to obtain the fusion result, may remove a synchronous clock source, realize a weak clock synchronization, and effectively reduce the cost. The preset frequency may be flexibly set, which, when set with a larger value, can reduce a time difference between the raw data of the sensors and improve data accuracy.

Embodiment II

The present embodiment further supplements the description of the point cloud data processing method provided in the above Embodiment I.

Figure 2:
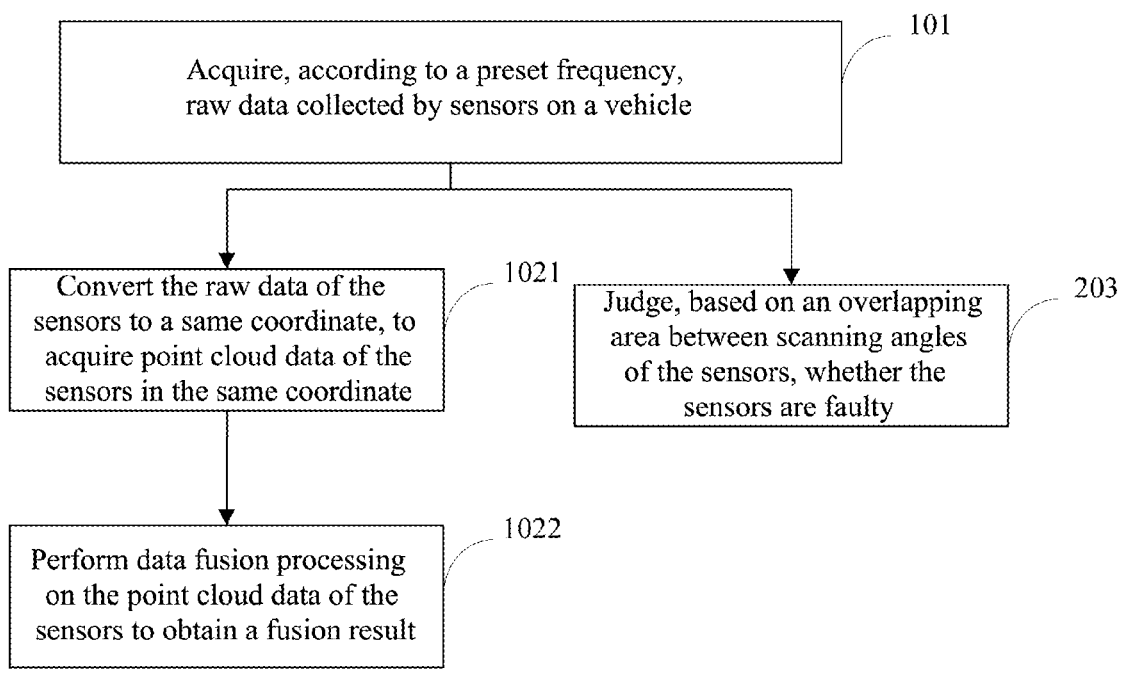
FIG. 2 is a schematic flowchart of a point cloud data processing method according to another embodiment of the present application.

FIG. 2 is a schematic flowchart of a point cloud data processing method according to the present embodiment.

As an implementable form, on the basis of the above Embodiment I, optionally, the performing, according to the raw data of the sensors, data fusion processing to obtain a fusion result, may specifically include:

performing, when a number of acquisition times reaches a preset number of times, the data fusion processing on raw data of the sensors for the preset number of times to obtain the fusion result.

Specifically, the preset number of times may be set. When a number of acquisition times of the raw data reaches the preset number of times, the raw data acquired in these times is fused together, and the specific preset number of times can be set as required, which and is not limited in the present embodiment. For example, once, twice, 10 times, 50 times, 100 times, etc.

Exemplarily, the point cloud data processing apparatus reads at one time, at the same time, the raw data collected by the sensors every 0.5 milliseconds, and the raw data read at one time collected by the multiple sensors may be referred to as a set of raw data. The raw data may be stored after each read, with the preset number of times being 4. Beginning after one data fusion, when a reading number of times reaches 4 again, four sets of raw data are acquired, and data fusion processing may be performed on the four sets of raw data to obtain a fusion result. The specific data fusion processing manner may be any implementable form in the prior art, which is not limited in the present embodiment.

Optionally, each point in the raw data has a corresponding timestamp, and a corresponding relationship between the raw data collected by different sensors at different times may be implemented according to the timestamp and the point coordinate.

Optionally, the preset number of times may set as 1, that is, data fusion is performed once every time the raw data is read. In this case, a fusion result obtained in one data fusion may not be the complete environmental information, and the complete environmental information may be acquired after multiple readings and fusions. The data fusion may be performed just after reading. When reading of the data acquired after one turn of scanning had been done, the data fusion is also completed immediately, which can improve the efficiency of the data fusion.

As another implementable form, on the basis of the above Embodiment I, optionally, the preset frequency is 1K-100K HZ, that is, a period of data acquisition corresponding to the preset frequency ranges from 1 to 0.01 milliseconds. Taking 0.5 milliseconds as an example, it equivalents to perform, within one second, 2000 times of alignment on the data collected by the sensors, thereby reducing a time difference between the data of the sensors to 0.5 milliseconds, and effectively improving the data accuracy.

As another implementable form, on the basis of the above Embodiment I, optionally, the raw data includes coordinate information of points, and the step 102 may specifically include:

Step 1021, convert the raw data of the sensors to a same coordinate to acquire point cloud data of the sensors in the same coordinate.

Step 1022, perform the data fusion processing on the point cloud data of the sensors to obtain the fusion result.

Specifically, any executable coordinate conversion algorithm may be used to convert the raw data of the sensors to the same coordinate. For example, image data that is in a same scene of the raw data of the sensors is acquired, and then a coordinate conversion matrix is determined according to the image data. It will not be repeated herein.

After acquiring the point cloud data of the sensors in the same coordinate, the data fusion processing may be performed on the point cloud data of the sensors to obtain the fusion result.

Optionally, the performing the data fusion processing on the point cloud data of the sensors to obtain the fusion result, may specifically include:

Step 2011, acquire overlapping point data and non-overlapping point data between point cloud data of different sensors.

Step 2012, perform fitting processing and point data fusion on the overlapping point data using a least square algorithm to acquire fused overlapping point data.

Step 2013, combine the non-overlapping point data and the fused overlapping point data to form fused point cloud data.

Specifically, since the scanning angles of the multiple sensors may have an overlapping portion, the raw data acquired by scanning also has an overlapping portion, and thus the point cloud data after coordinate conversion also has an overlapping portion. Therefore, in the data fusion process, point cloud data of the overlapping portion is required to be processed. The point cloud data of the sensors can be divided first into an overlapping point data set and a non-overlapping point data set, where the non-overlapping point data set includes point data (that is, non-overlapping point data) of point cloud data of a sensor that does not overlap with that of the other sensors, and the overlapping point data set includes point data (that is, overlapping point data) that overlaps between the sensors. For these overlapping point data, the least square algorithm can be used for performing fitting processing on the overlapping point data to form a least square curved surface, and then point data with a Euclidean distance less than a threshold is fused together based on the Euclidean distance between the points, thereby achieving de-overlapping of the overlapping point data. Then, the fused overlapping point data set and the non-overlapping point data set are combined to acquire the fused point cloud data.

Optionally, any one of two overlapping points in the overlapping point data set may be deleted, and only one point is kept.

Optionally, other processing manners may be used to process the point data of the overlapping portion, which may be selected as required and is not limited in the present embodiment.

In an embodiment, optionally, the performing the data fusion processing on the point cloud data of the sensors to obtain the fusion result, may specifically include:

Step 2021, acquire, according to scanning angles of the sensors, non-overlapping point cloud data of the sensors; and Step 2022, combining the non-overlapping point cloud data of the sensors together to form fused point cloud data.

Specifically, some of the data (that is, the overlapping portion may be excluded, or a few overlapping portions may be included, and it is set specifically as required) may be acquired according to the scanning angles of the sensors, so as to be used for data fusion, thereby improving a fusion efficiency. For example, a first sensor scans for 0-120 degrees, and a second sensor scans for 90-180 degrees, such that data within a range of 0-90 degrees in raw data of the first sensor and data within a range of 90-180 degrees in raw data of the second sensor can be acquired for fusion, and this is merely illustrative and is not intended to be limiting. Specifically, settings may be done as required, and is not limited in the present embodiment.

As another implementable form, on the basis of the above Embodiment I, optionally, the method may further include:

Step 203, judge, based on an overlapping area between scanning angles of the sensors, whether the sensors are faulty.

By setting multiple sensors, cross fault tolerance can be performed, that is, whether the sensors are faulty is judged according to the overlapping area between the scanning angles of the sensors. Specifically, since the scanning angles of the sensors have the overlapping area, two sensors having an overlapping area may scan to a same point, and it can be proved whether they are faulty according to whether the two sensors acquires scan data of the angle overlapping area. For example, one sensor has scanned, and the other sensor has also scanned at this scanning angle, however no scanning data is acquired, it can be proved that such sensor is faulty and does not normally collect data or the data cannot be read normally, thereby achieving cross fault tolerance and detecting the faulty sensor in time.

Optionally, after determining that a certain sensor is faulty, the vehicle may be controlled to decelerate or stop in time, and a prompt message may be sent on a display screen or a voice broadcast apparatus of the vehicle to promptly remind a passenger on the vehicle and improve a safety of the vehicle.

Optionally, a driving safety of the vehicle can be further improved by the redundant setting of the sensors. When reading the data of the sensors, if data in a sensor cannot be read, it can be read from another sensor with a same angle.

It should be noted that each implementable form in the present embodiment may be implemented separately, or may be implemented in any combination in a situation without conflict, which is not limited in the present application.

The point cloud data processing method provided by the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy. The data accuracy is further improved by de-overlapping an overlapping data portion. The driving safety of the vehicle is improved by cross fault tolerance of multiple sensors.

Embodiment III

The present embodiment provides a point cloud data processing apparatus for executing the method of the above Embodiment I.

Figure 3:
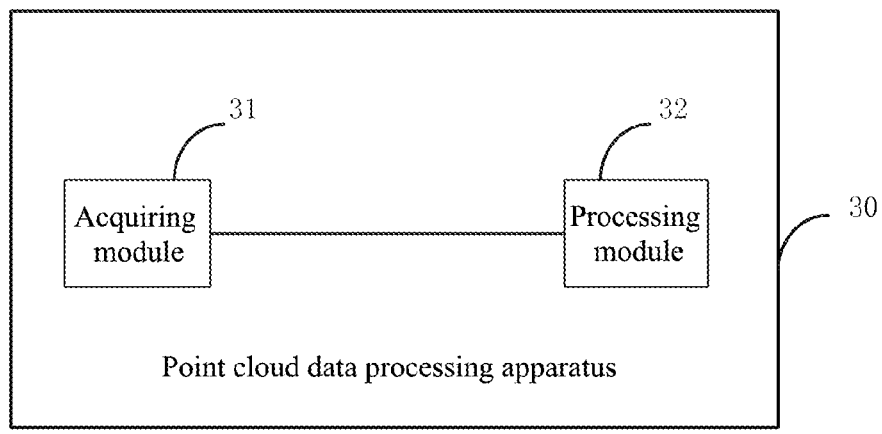
FIG. 3 is a schematic structural diagram of a point cloud data processing apparatus according to an embodiment of the present application.

FIG. 3 is a schematic structural diagram of a point cloud data processing apparatus according to the present embodiment. A point cloud data processing apparatus 30 includes an acquiring module 31 and a processing module 32.

The acquiring module 31 is configured to acquire, according to a preset frequency, raw data collected by sensors on a vehicle; and the processing module 32 is configured to perform, according to the raw data of the sensors, data fusion processing to obtain a fusion result.

For the apparatus in the present embodiment, the specific manner for the modules to perform the operations has been described in detail in the embodiment related to the method, and will not be explained in detail herein.

The point cloud data processing apparatus according to the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy.

Embodiment IV

The present embodiment further supplements the description of the apparatus according to the above Embodiment III to perform the method according to the above Embodiment II.

As an implementable form, on the basis of the above Embodiment III, optionally, the processing module is specifically configured to:

perform, when a number of acquisition times reaches a preset number of times, the data fusion processing on raw data of the sensors for the preset number of times to obtain the fusion result.

Optionally, the preset number of times is one.

As another implementable form, on the basis of the above Embodiment III, optionally, the preset frequency is 1K-100K HZ.

As another implementation form, on the basis of the above Embodiment III, optionally, the raw data includes coordinate information;

the processing module is specifically configured to:

convert the raw data of the sensors to a same coordinate to acquire point cloud data of the sensors in the same coordinate; and perform the data fusion processing on the point cloud data of the sensors to obtain the fusion result.

Optionally, the processing module is specifically configured to:

acquire overlapping point data and non-overlapping point data between point cloud data of different sensors;

perform fitting processing and point data fusion on the overlapping point data using a least square algorithm to acquire fused overlapping point data; and combine the non-overlapping point data and the fused overlapping point data to form fused point cloud data.

Optionally, the processing module is specifically configured to:

acquire, according to scanning angles of the sensors, non-overlapping point cloud data of the sensors; and combine the non-overlapping point cloud data of the sensors together to form fused point cloud data.

As another implementable form, on the basis of the above Embodiment III, optionally, the processing module is further configured to:

judge, based on an overlapping area between scanning angles of the sensors, whether the sensor are faulty.

For the apparatus in the present embodiment, the specific manner for the modules to perform the operations has been described in detail in the embodiment related to the method, and will not be explained in detail herein.

It should be noted that each implementable form in the present embodiment may be implemented separately, or may be implemented in any combination in a situation without conflict, which is not limited in the present application.

The point cloud data processing apparatus according to the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy. The data accuracy is further improved by de-overlapping an overlapping data portion. Driving safety of the vehicle is improved by cross fault tolerance of multiple sensors.

Embodiment V

The present embodiment provides a computer device for performing the methods provided in the above embodiments.

Figure 4:
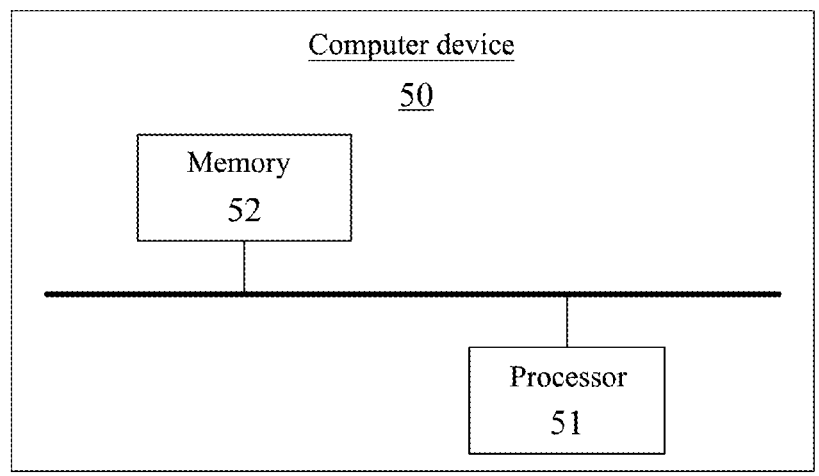
FIG. 4 is a schematic structural diagram of a computer device according to an embodiment of the present application.

FIG. 4 is a schematic structural diagram of a computer device according to the present embodiment. The computer device 50 includes: at least one processor 51 and a memory 52;

the memory stores a computer program; the at least one processor executes the computer program stored in the memory to implement the methods of the above embodiments.

The computer device according to the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy. The data accuracy is further improved by de-overlapping an overlapping data portion. Driving safety of the vehicle is improved by cross fault tolerance of multiple sensors.

Embodiment VI

The present embodiment provides a vehicle for performing the methods provided by the above embodiments.

Figure 5:
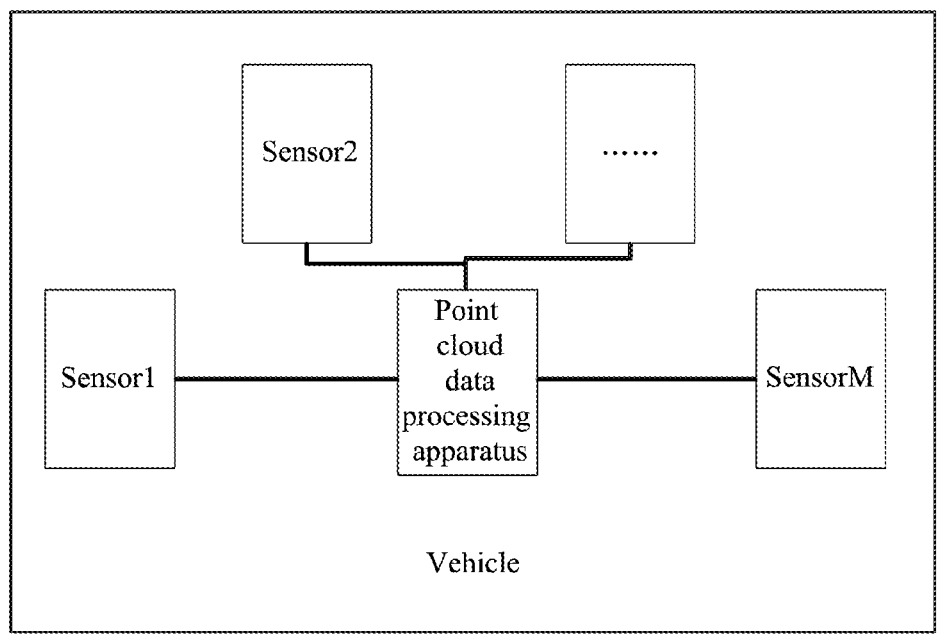
FIG. 5 is a schematic structural diagram of a vehicle according to an embodiment of the present application.

FIG. 5 is a schematic structural diagram of a vehicle according to the present embodiment. The vehicle includes: at least two sensors and an apparatus provided by any one of the above embodiments. M is an integer greater than 1. The sensors can be laser radars, and can also include different types of other sensors such as a camera, a binocular camera, a monocular camera, a radar, and a millimeter wave radar.

The vehicle according to the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy. The data accuracy is further improved by de-overlapping an overlapping data portion. Driving safety of the vehicle is improved by cross fault tolerance of multiple sensors.

Embodiment VII

The embodiment provides a computer readable storage medium storing a computer program that, when executed, implements the method of any one of the above embodiments.

The computer readable storage medium according to the present embodiment, by acquiring, according to the preset frequency, the raw data collected by the sensors on the vehicle in a latest period, and performing the data fusion to obtain the fusion result, may remove a synchronous clock source, realize a weak clock synchronization, and effectively reduce the cost The preset frequency may be flexibly set, which, when set with a larger value, can reduce a time difference between the raw data of the sensors and improve data accuracy. The data accuracy is further improved by de-overlapping an overlapping data portion. Driving safety of the vehicle is improved by cross fault tolerance of multiple sensors.

In the several embodiments provided by the present application, it should be understood that the disclosed apparatus and method may be implemented in other manners. For example, the apparatus embodiments described above are merely illustrative. For example, the division of the unit is only a logical function division, and there may be another division manner in actual implementation; for example, multiple units or components may be combined or may be integrated into another system, or some features can be ignored or not be executed. In addition, the mutual coupling or direct coupling or communication connection shown or discussed may be an indirect coupling or communication connection through some interfaces, apparatuses or units, and may be in an electrical form, mechanical form or in other forms.

The unit described as a separate component may or may not be physically separated, and the component displayed as a unit may or may not be a physical unit, that is, may be located in one place, or may be distributed to multiple network units. Some or all the units may be selected as required, to achieve the purpose of the solution of the embodiment.

In addition, each functional unit in the embodiments of the present application may be integrated into one processing unit, or each unit may exist physically separately, or two or more units may be integrated into one unit. The above integrated unit can be implemented in the form of hardware or in the form of hardware plus software functional units.

The integrated unit described above implemented in the form of a software functional unit can be stored in a computer readable storage medium. The above software functional unit is stored in a storage medium and includes instructions for causing a computer device (which may be a personal computer, a server, or a network device, etc.) or a processor to perform part of the steps of the methods according to the various embodiments of the present application. The above storage medium includes media that store program codes like a U disk, a mobile hard disk, a read-only memory (ROM), a random access memory (RAM), a magnetic disk, or an optical disk.

Those skilled in the art can clearly understand that only the division of the functional modules described above is exemplified for convenience and brevity of description. In practical applications, the above functions can be assigned to different functional modules as required, that is, the internal structure of the apparatus can be divided into different functional modules to perform all or part of the functions described above. Reference is made to corresponding processes in the above method embodiments for the specific working processes of the apparatus described above, which will not be repeated herein.

Finally, it should be noted that the above embodiments are merely illustrative of the technical solutions of the present application, and are not to be taken in a limiting sense; although the present application has been described in detail with reference to the above embodiments, those skilled in the art will understand that they may still modify the technical solutions described in the above embodiments, or equivalently substitute some or all of the technical features; and the modifications or substitutions do not deviate the nature of the corresponding technical solutions from the range of the technical solutions of each embodiment of the present application.

What is claimed is:

1. A point cloud data processing method, comprising: acquiring, by point cloud data processing apparatus, according to a preset frequency, raw data collected by sensors on a vehicle, wherein a period corresponding to the preset frequency is shorter than a time required for the sensors to scan one turn; and performing, by the point cloud data processing apparatus, when a number of acquisition times reaches a preset number of times, data fusion processing on the raw data of the sensors for the preset number of times is determined according to the time required for the sensors to scan one turn and the preset frequency; wherein the raw data comprises coordinate information; the performing, by the point cloud data processing apparatus, when a number of acquisition times reaches a preset number of times, the data fusion processing on the raw data of the sensors for the preset number of times to obtain the fusion result for controlling the vehicle, comprises: converting, by the point cloud data processing apparatus, the raw data of the sensors to a same coordinate to acquire point cloud data of the sensors in the same coordinate; and performing, by the point cloud data processing apparatus, the data fusion processing on the point cloud data of the sensors to obtain the fusion result; wherein the performing, by the point cloud data processing apparatus, the data fusion processing on the point cloud data of the sensors to obtain the fusion result, comprises: dividing, by the point cloud data processing apparatus, the point cloud data of the sensors into an overlapping point data set and a non-overlapping point data set; wherein the non-overlapping point data set comprises non-overlapping point data of each of the sensor that does not overlap with that of any other of the sensors, and the overlapping point data set comprises overlapping point data that overlaps between the sensors; performing, by the point cloud data processing apparatus, fitting processing on the overlapping point data using a least square algorithm to form a least square curved surface, and fusing data of points with a Euclidean distance less than a threshold together based on the Euclidean distance between the points to acquire fused overlapping point data; and combining, by the point cloud data processing apparatus, the non-overlapping point data and the fused overlapping point data to form fused point cloud data.

2. The method of claim 1, wherein the preset frequency is 1K-100K HZ.

3. The method of claim 1, further comprising: judging, by the point cloud data processing apparatus, based on an overlapping area between scanning angles of the sensors, whether the sensors are faulty.

4. The method of claim 3, further comprising: controlling, by the point cloud data processing apparatus, the vehicle to decelerate or stop when it is determined that at least one of the sensors is faulty.

5. The method of claim 3, further comprising: for two sensors having an overlapping area, judging, by the point cloud data processing apparatus, a sensor of the two sensor whose raw data is not acquired is faulty if there is raw data of one sensor being acquired in the overlapping area between scanning angles of the sensors, wherein the faulty comprises: a sensor not collecting data normally, or raw data of a sensor not being read normally.

6. The method of claim 1, wherein the sensors on the vehicle keep rotating and scanning without stopping during automatic driving of the vehicle.

7. A non-transitory computer readable storage medium, wherein the non-transitory computer readable storage medium stores a computer program that, when executed, implements the method according to claim 1.

8. A point cloud data processing apparatus, comprising: at least one processor and a memory; the memory stores a computer program; the at least one processor executes the computer program stored in the memory to: acquire, according to a preset frequency, raw data collected by sensors on a vehicle, wherein a period corresponding to the preset frequency is shorter than a time required for the sensors to scan one turn; perform, when a number of acquisition times reaches a preset number of times, data fusion processing on the raw data of the sensors for the preset number of times to obtain a fusion result for controlling the vehicle, wherein the preset number of times is determined according to the time required for the sensors to scan one turn and the preset frequency; wherein the raw data comprises coordinate information; the at least one processor executes the computer program stored in the memory to: convert the raw data of the sensors to a same coordinate to acquire point cloud data of the sensors in the same coordinate; and perform the data fusion processing on the point cloud data of the sensors to obtain the fusion result; wherein the at least one processor executes the computer program stored in the memory to: divide the point cloud data of the sensors into an overlapping point data set and a non-overlapping point data set; wherein the non-overlapping point data set comprises non-overlapping point data of each of the sensor that does not overlap with that of any other of the sensors, and the overlapping point data set comprises overlapping point data that overlaps between the sensors; perform fitting processing on the overlapping point data using a least square algorithm to form a least square curved surface, and fuse data of points with a Euclidean distance less than a threshold together based on the Euclidean distance between the points to acquire fused overlapping point data; and combine the non-overlapping point data and the fused overlapping point data to form fused point cloud data.

9. The apparatus of claim 8, wherein the preset frequency is 1K-100K HZ.

10. The apparatus of claim 8, wherein the at least one processor executes the computer program stored in the memory to:
   judge, based on an overlapping area between scanning angles of the sensors, whether the sensors are faulty.

11. The apparatus of claim 10, wherein the at least one processor executes the computer program stored in the memory to:
   control the vehicle to decelerate or stop when it is determined that at least one of the sensors is faulty.

12. A vehicle, comprising at least two sensors and the apparatus according to claim 8.

* * * * *